(12) United States Patent
Ting

(10) Patent No.: US 6,454,414 B1
(45) Date of Patent: Sep. 24, 2002

(54) DEVICE FOR IMAGE OUTPUT AND INPUT

(75) Inventor: Chin-Lung Ting, Tainan (TW)

(73) Assignee: Chi Mei Optoelectronics Corporation, Tainan (TW)

( * ) Notice: Subject to any disclaimer, the term of this patent is extended or adjusted under 35 U.S.C. 154(b) by 0 days.

(21) Appl. No.: 09/661,108

(22) Filed: Sep. 13, 2000

(30) Foreign Application Priority Data

May 24, 2000 (TW) ........................................ 89110024 A

(51) Int. Cl.[7] ............................ G03B 21/26; H04N 7/14
(52) U.S. Cl. .................... 353/28; 348/14.07; 348/14.08; 348/14.1
(58) Field of Search ......................... 353/28; 348/14.07, 348/14.08, 14.1

(56) References Cited

U.S. PATENT DOCUMENTS

| | | | | |
|---|---|---|---|---|
| 5,400,069 A | * | 3/1995 | Braun et al. | 348/14.16 |
| 5,406,323 A | * | 4/1995 | Tanigaki et al. | 353/28 |
| 6,252,707 B1 | * | 6/2001 | Kleinberger et al. | 359/465 |

* cited by examiner

*Primary Examiner*—Russell Adams
*Assistant Examiner*—Magda Cruz
(74) *Attorney, Agent, or Firm*—J.C. Patents

(57) ABSTRACT

An image input/output device comprises a semi-transparent display and an image capture device. The semi-transparent has a displaying surface for displaying images to a user and an opposite surface respective to the displaying surface, and has a plurality of transparent regions thereon. The image capture device is located right behind the opposite surface of the semi-transparent display, and used for capturing an image of the user through the transparent regions.

23 Claims, 3 Drawing Sheets

DEVICE FOR IMAGE OUTPUT AND INPUT

CROSS-REFERENCE TO RELATED APPLICATION

This application claims the priority benefit of Taiwan application Ser. No. 89110024, filed May 24, 2000.

BACKGROUND OF THE INVENTION

1. Field of Invention

The present invention relates to a multimedia device. More particularly, the present invention relates to a multimedia device for image output and input.

2. Description of Related Art

Those tremendous image data transmitted and received through a telecommunication network becomes modem trends because the telecommunication network is widely used and its transmission rate increases. Therefore, a variety of image input/output devices are developed. For example, in addition to voice signals, a video telephone system can be used for receiving and transmitting images such that the video telephone users of both sides can see each other.

FIG. 1 shows a conventional image input/output device of a video telephone system. Referring to FIG. 1, the image input/output device 100 includes a display 120 and a CCD (charged coupled device) camera 140 located above the display 120, of which the display 120 is used for displaying an image of an opposite-side user, which is from the output end OUT of an image input/output device 100 at another user's location, to a user 66 in front of the display 120. The CCD camera 140 is used for capturing the image of the user 66, transferring the image of the user 66 to electronic signals and then transmitting the image to the input end IN of the image input/output device 100 to the opposite-side user. However, because the CCD camera 140 is located above the display 120 and the user 66 usually looks right at the front of the display 120, the CCD camera 140 above the display 120 then takes an image that the user 66 looks at the display 120 downwards. Accordingly, the opposite-side user then receives the image that the user 66 looks at the display 120 downwards, rather than looks right at the front of the display 120. Both users of the video telephone system do not face to each other, and feel annoying and difficult to communicate.

SUMMARY OF THE INVENTION

As embodied and broadly described herein, the invention provides an image input/output device, comprising a semi-transparent display and an image capture device. The semi-transparent display has a displaying surface for displaying images to a user and an opposite surface respective to the displaying surface. The image capture device is assembled right behind the semi-transparent display, wherein the image capture device is substantially aligned with a line of sight of the user. The semi-transparent display further comprises a number of pixels and transparent holes formed between the displaying surface and the opposite surface of the semi-transparent display, and each of the pixels are further formed on a non-transparent layer. The pixels and the transparent holes are distributed uniformly and interleaved periodically.

The present invention further provides an image input/output device, comprising a semi-transparent display and a charge coupled device (CCD) camera. The semi-transparent display has a displaying surface for displaying images to a user and an opposite surface respective to the displaying surface, and has a number of pixels and transparent holes thereon. The CCD camera is located right behind the opposite surface of the semi-transparent display, and used for capturing an image of the user through the transparent holes. The pixels and the transparent holes are distributed uniformly and interleaved periodically, avoiding the displayed image having lines thereon. In addition, self-luminescent display is preferable for the semi-transparent display because no external light source is required.

Furthermore, the distance between the semi-transparent display and the image capture device is less than the focus of the image capture device, avoiding forming images of the non-transparent parts such as the CCD camera on the image capture device.

Accordingly, using the image input/output device of the present invention, the user looks right in front of the semi-transparent display and the image capture device behind the semi-transparent display can capture an image that the user looks right in front of the semi-transparent display. Therefore, the users of both sides can communicate face to face via a video telephone system.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
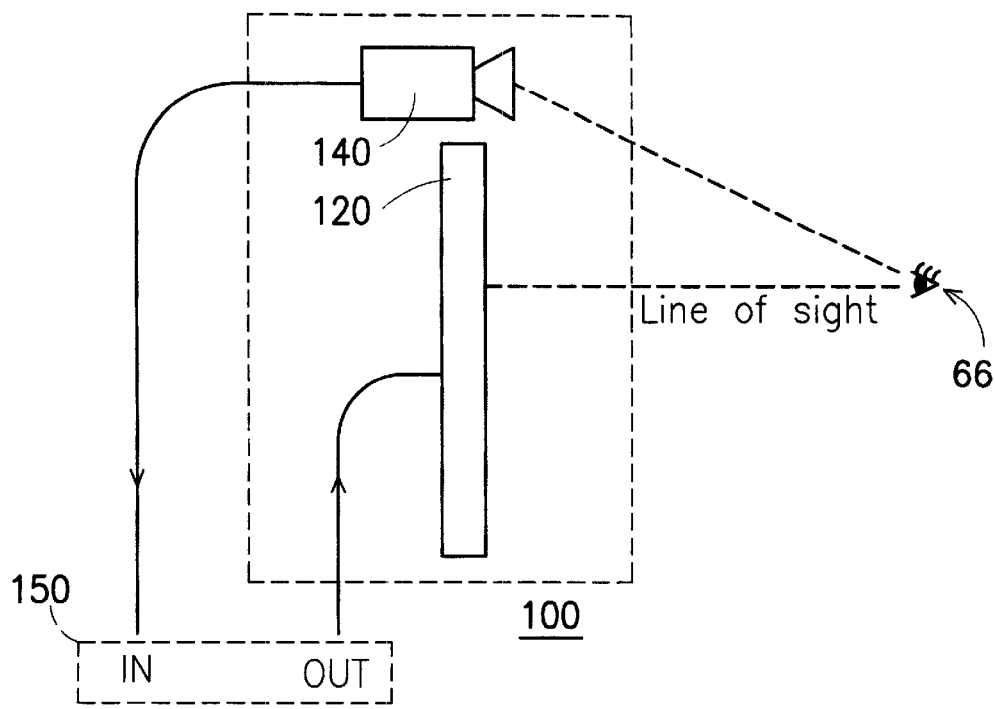
FIG. 1 shows a conventional image input/output device of a video telephone system showing a relative position to a user's eyes.
Figure 2:
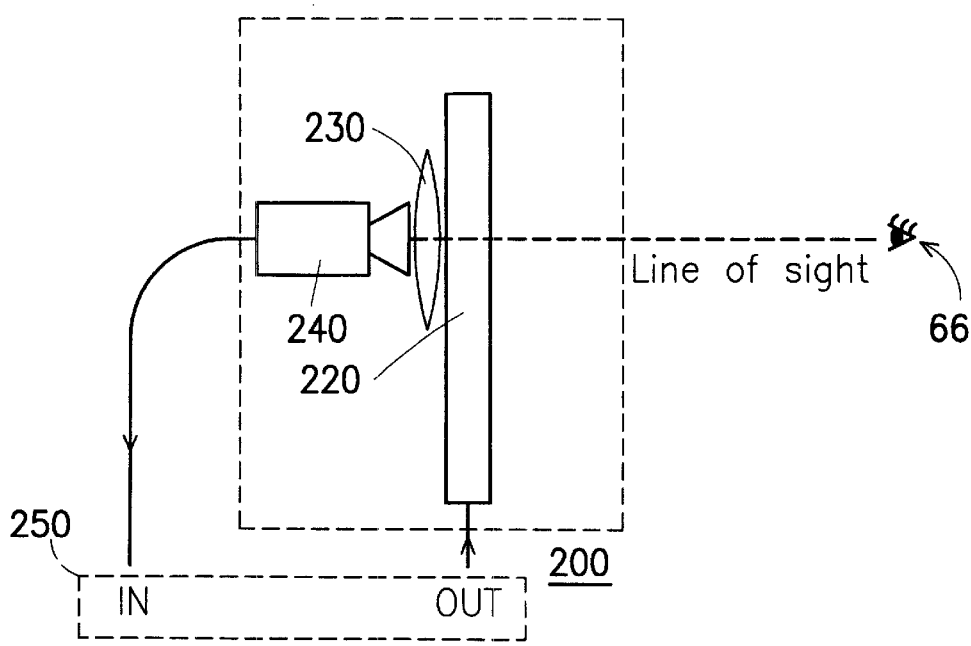
FIG. 2 schematically shows an image input/output device according to one referred embodiment of the present invention, showing a relative position to a user's eyes.

FIG. 2 schematically shows an image input/output device according to one preferred embodiment of the present invention. The image input/output device has a variety of applications, and a video telephone system is described hereinafter as an example. A user can use the image input/output device of the video telephone system for receiving another user's image and transmitting the user's own image. The users of both sides of the video telephone system can communicate face to face via the video telephone system.

Referring to FIG. 2, the image input/output device 200 comprises a semi-transparent display 220 and an image capture device 240, such as a charge coupled device (CCD)

camera 240. The semi-transparent display 220 can be an output device having a displaying surface for displaying images, which is from the output end OUT of an image input/output device 250 at another user's location, to the user 66 and an opposite surface respective to the displaying surface. The image capture device (CCD camera) 240 is assembled right behind the semi-transparent display 220, wherein the image capture device 240 is substantially aligned with a line of sight of the user 66. The CCD camera 240 is used for receiving the image of the user 66, transferring into electronic signals, and then transmitting the image to the input end IN of the image input/output device 250.

In addition, if both users use the image input/output device of the present invention, the CCD cameras of both image input/output device 200, 250 can capture both users images that look right in front of the display 220. Therefore, both users can see each other face to face to each other through the video telephone system, by which a good communication is conducted.

The semi-transparent display further comprises a number of pixels and transparent regions, such as holes, formed between the displaying surface and the opposite surface of the semi-transparent display 220. Due to the transparent regions, the display 220 is semi-transparent. The pixels and the transparent regions are distributed uniformly and interleaved periodically, avoiding the displayed image having lines thereon. The pixels can be single-color pixels, such as black/white pixels, or pixels consisting of prime colors, such as red (R), green (G) and blue (B) colors.

Figure 3A:
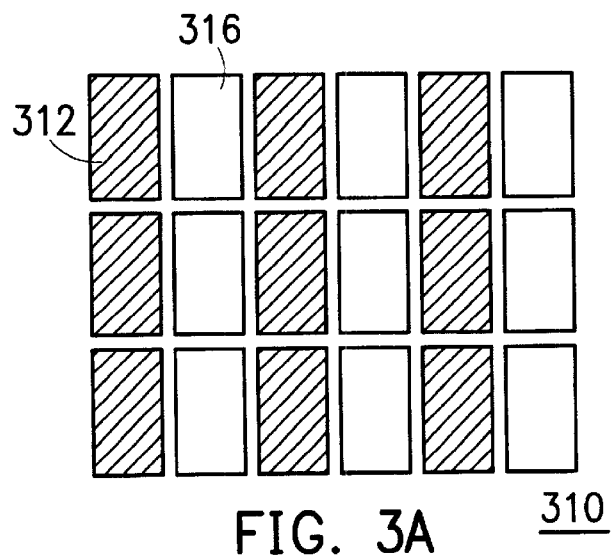
FIGS. 3A~3B schematically shows possible arrangement patterns of the pixels and the transparent regions for a single-color semi-transparent display according to one preferred embodiment of the present invention.
Figure 3B:
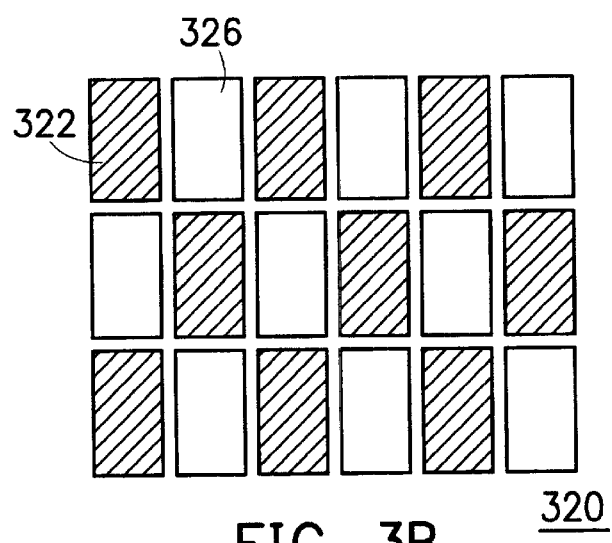

FIGS. 3A~3B schematically shows possible arrangement patterns of the pixels and the transparent regions for a single-color semi-transparent display. Referring to FIG. 3A, a column of the pixels 312 and a column of the semi-transparent regions 316 of the single-color semi-transparent display 310 are periodically interleaved. FIG. 3B shows another possible pattern. As shown in FIG. 3B, each of the pixels 322 and the transparent regions 326 of the single-color semi-transparent display 320 are uniformly arranged and interleaved like a chessboard. The patterns shown in FIGS. 3A and 3B are only examples, not used for limiting the scope of the present invention.

Figure 3C:
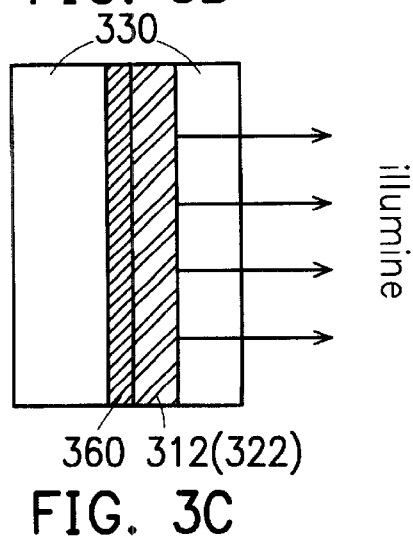
FIG. 3C schematically shows a cross-sectional view of each pixel shown in FIGS. 3A and 3B.

FIG. 3C schematically shows a cross-sectional view of each pixel shown in FIGS. 3A and 3B. As shown in FIG. 3C, according to the present invention, the single-color semi-transparent display 310/320 is designed that only one surface, which is the displaying surface, can illumine and display the image. Each of the pixels 312/322 has to be attached a non-transparent layer 360, such as a metal layer, on the back surface (non-luminescent surface) of each pixel 312/322. Then, the pixels 312/322 display image towards the user 66. In addition, transparent layers 330 can further cover the pixels 312/322 and the non-transparent layer 360. A substrate for the semi-transparent display 310/320, protection layers, and electrodes for controlling the pixels can be included within the transparent layers 330.

Figure 4A:
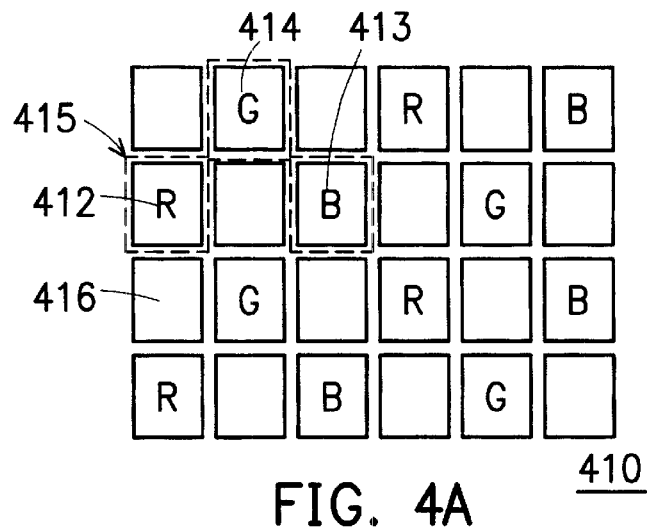
FIGS. 4A~4B schematically shows possible arrangement patterns of the pixels and the transparent regions for a color semi-transparent display according to one preferred embodiment of the present invention.
Figure 4B:
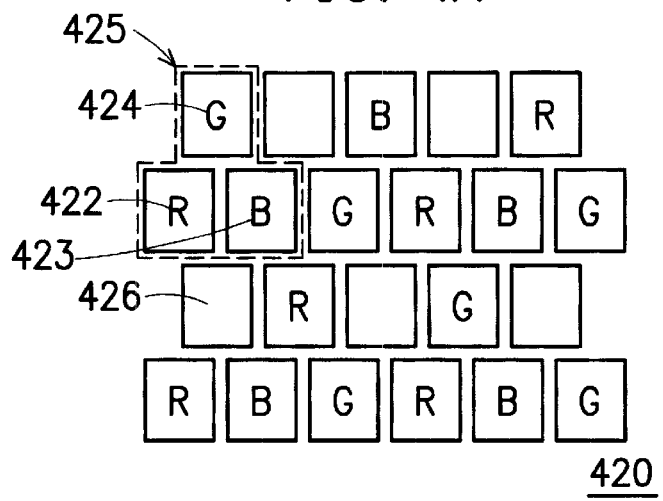

FIGS. 4A~4B schematically shows possible arrangement patterns of the pixels and the transparent regions for a color semi-transparent display. Referring to FIG. 4A, within the semi-transparent display 410, red (R) pixels 412, green (G) pixels 413 and blue (B) pixels 414 and the transparent regions 416 are arranged in an interleaved pattern. For each row or column, each the transparent region 416 is located between two color pixels. Namely, the transparent regions 416 are uniformly distributed among the color (R, G and B) pixels 412, 413, 414. FIG. 4B shows another possible pattern for example. As shown in FIG. 4B, within the semi-transparent display 420, red (R) pixels 422, green (G) pixels 423 and blue (B) pixels 424 are adjacent to each other, forming a color pixel 425 which is substantially a triangular shape. The transparent regions 426 are uniformly located among the color pixels 425. It should be noticed that the two patterns mentioned above are only examples, not used for limiting the scope of the present invention.

Figure 4C:
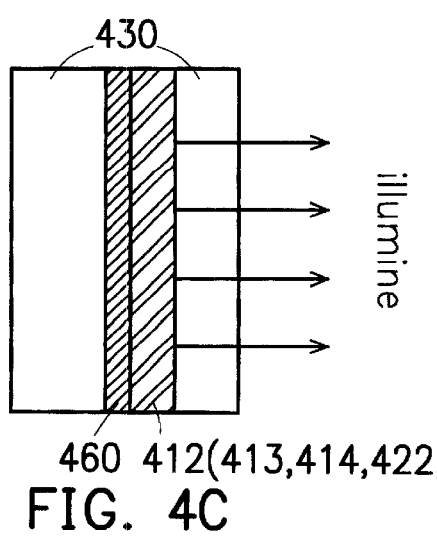
FIG. 4C schematically shows a cross-sectional view of each pixel shown in FIGS. 4A and 4B.

FIG. 4C schematically shows a cross-sectional view of each pixel shown in FIGS. 4A and 4B, which is similar to the structure shown in FIG. 3C. As shown in FIG. 4C, according to the present invention, the color semi-transparent display 410/420 is designed that only one surface, which is the displaying surface, can illumine and display the image. Each of the pixels 412/413/414 or 422/423/424 has to be attached a non-transparent layer 460, such as a metal layer, on the back surface (non-luminescent surface) of each pixel 412/413/414 or 422/423/424. Then, the pixels 412/413/414 or 422/423/424 display image towards the user 66. In addition, transparent layers 430 can further cover the pixels 412/413/414 or 422/423/424 and the non-transparent layer 460. A substrate for the semi-transparent display 410/420, protection layers, and electrodes for controlling the pixels can be included within the transparent layers 430.

Referring to FIG. 2, using pixel patterns for the semi-transparent display 310, 320, 410, 420, shown in FIGS. 3A~3B and 4A~4B, for the image input/output device 200, the distance between the image capture device, such as the CCD camera 240, and the semi-transparent display 220 is less than the focus of the CCD camera 240. Accordingly, the image of non-transparent layers 360/460 is not projected on the CCD camera 240 and therefore the image quality is not affected.

Furthermore, according to the embodiment of the invention, the semi-transparent display can be a self-luminescent display. For example, an electro-luminescent (EL) display, such as an organic electro-luminescent (OEL) display is preferred. In addition, a thin-film-transistor electro-luminescent (TFT-EL) display is also suitable for the semi-transparent display because of its short response time, low operation voltage and low power consumption.

Advantageously, assembling the semi-transparent display into the image input/output device of the video telephone system, the CCD camera can capture the user's image looking right in front of the display panel, transmitting the image to the opposite user. The users of both sides can be face to face through the video telephone system.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An image input/output devices comprising:
   a semi-transparent display, having a first surface and a second surface, wherein the first surface is used for displaying images, wherein the semi-transparent display has a plurality of pixels and a plurality of transparent regions between some of the pixels; and
   an image capture device installed right behind the second surface of the semi-transparent display, for capturing images via the transparent regions of the semi-transparent display.

2. The image input/output device of claim 1, wherein a distance between the semi-transparent display and the image capture device is sufficiently small such that the semi-transparent display is not projected on the image capture device.

3. The image input/output device of claim 1, wherein the transparent regions comprise holes uniformly distributed in the semi-transparent display.

4. The image input/output device of claim 1, wherein the pixels and the transparent regions are distributed uniformly and interleaved periodically.

5. The image input/output device of claim 1, wherein the semi-transparent display comprises a self-luminescent display.

6. The image input/output device of claim 5, wherein the self-luminescent display comprises an electro-luminescent (EL) display.

7. The image input/output device of claim 6, wherein the electro-luminescent (EL) display comprises an organic electro-luminescent (OEL) display.

8. The image input/output device of claim 1, wherein the semi-transparent display comprises a thin-film-transistor electro-luminescent (TFT-EL) display.

9. The image input/output device of claim 1, wherein the image capture device is a charge coupled device (CCD) camera.

10. An image input/output device, comprising:
a semi-transparent display used for an image output device, wherein a surface of the semi-transparent display is used for displaying images to a user, and the semi-transparent display comprises a plurality of transparent regions and a plurality of pixels, wherein some of the pixels abut the transparent regions; and
a charge coupled device (CCD) camera located at the other surface of the semi-transparent display, and used for capturing an image of the user via the transparent regions.

11. The image input/output device of claim 10, wherein a distance between the semi-transparent display and the image capture device is sufficiently small such that the semi-transparent display is not projected on the image capture device.

12. The image input/output device of claim 10, wherein the transparent regions comprise holes uniformly distributed in the semi-transparent display.

13. The image input/output device of claim 10, wherein the pixels and the transparent regions are distributed uniformly and interleaved periodically.

14. The image input/output device of claim 10, wherein the semi-transparent display comprises a self-luminescent display.

15. The image input/output device of claim 14, wherein the self-luminescent display comprises an electro-luminescent (EL) display.

16. The image input/output device of claim 15, wherein the electro-luminescent (EL) display comprises an organic electro-luminescent (OEL) display.

17. The image input/output device of claim 10, wherein the semi-transparent display comprises a thin-film-transistor electro-luminescent (TFT-EL) display.

18. A semi-transparent display, comprising a first surface and a second surface, wherein the first surface is used for displaying images, and a plurality of pixels with respect to primary colors and transparent regions are formed in the semi-transparent display, the pixels and the transparent regions are arranged uniformly and interleaved periodically.

19. The semi-transparent display of claim 18, wherein each of the pixels has a non-transparent layer on the second surface of the semi-transparent display such that the images are displayed on the first surface of the semi-transparent display.

20. The semi-transparent display of claim 18, wherein the semi-transparent display comprises a self-luminescent display.

21. The semi-transparent display of claim 20, wherein the self-luminescent display comprises an electro-luminescent (EL) display.

22. The semi-transparent display of claim 21, wherein the electro-luminescent (EL) display comprises an organic electro-luminescent (OEL) display.

23. The semi-transparent display of claim 18, wherein the electro-luminescent (EL) display comprises a thin-film-transistor electro-luminescent (TFT-EL) display.

* * * * *